(12) United States Patent
Han et al.

(10) Patent No.: US 12,482,506 B2
(45) Date of Patent: Nov. 25, 2025

(54) MAGNON JUNCTION, MAGNON RANDOM ACCESS MEMORY, MAGNON MICROWAVE OSCILLATOR AND DETECTOR, ELECTRONIC DEVICE

(71) Applicant: Institute of Physics, Chinese Academy of Sciences, Beijing (CN)

(72) Inventors: Xiufeng Han, Beijing (CN); Leina Jiang, Beijing (CN); Wenqing He, Beijing (CN); Tianyi Zhang, Beijing (CN)

( * ) Notice: Subject to any disclaimer, the term of this patent is extended or adjusted under 35 U.S.C. 154(b) by 108 days.

(21) Appl. No.: 18/440,928

(22) Filed: Feb. 13, 2024

(65) Prior Publication Data

US 2024/0274177 A1 Aug. 15, 2024

(30) Foreign Application Priority Data

Feb. 14, 2023 (CN) .......................... 202310147344.4

(51) Int. Cl.
*G11C 11/00* (2006.01)
*G11C 11/16* (2006.01)
(Continued)

(52) U.S. Cl.
CPC ........ *G11C 11/161* (2013.01); *G11C 11/1673* (2013.01); *G11C 11/1675* (2013.01);
(Continued)

(58) Field of Classification Search
CPC .............. G11C 11/161; G11C 11/1673; G11C 11/1675; H10B 61/20; H10N 52/85; H10N 50/85; H10N 50/10; H01F 10/3286
(Continued)

(56) References Cited

U.S. PATENT DOCUMENTS 6,744,086 B2 * 6/2004 Daughton ............. G11C 11/161
257/295
7,813,202 B2 * 10/2010 Rodmacq ............. G11C 11/161
360/324.11
(Continued)

FOREIGN PATENT DOCUMENTS

CN 109755383 A * 5/2019
CN 118510374 A * 8/2024 ............. G06F 7/588
(Continued)

*Primary Examiner* — Viet Q Nguyen
(74) *Attorney, Agent, or Firm* — Chang & Hale LLP (57) ABSTRACT

Disclosed are a magnon junction, magnon random access memory, microwave oscillator and detector, and electronic device. The magnon junction comprises: a first electrode layer formed by non-magnetic conductive material; a free magnetic layer arranged on the first electrode layer, formed by ferromagnetic conductive material; an antiferromagnetic barrier layer arranged on the free magnetic layer, formed by antiferromagnetic insulator material; a reference magnetic layer arranged on the antiferromagnetic barrier layer, formed by ferromagnetic conductive material; and a second electrode layer arranged on the reference magnetic layer, formed by non-magnetic conductive material. The reference magnetic layer has perpendicular magnetic anisotropy or perpendicular magnetic moment component, moment direction of which is fixed along a vertical direction; the free magnetic layer has perpendicular magnetic anisotropy or a perpendicular magnetic moment component, moment direction of which is flippable along the perpendicular direction; the antiferromagnetic barrier layer has perpendicular magnetic anisotropy or perpendicular magnetic moment component.

17 Claims, 8 Drawing Sheets

(51) Int. Cl.
  *H01F 10/32* (2006.01)
  *H10B 61/00* (2023.01)
  *H10N 50/10* (2023.01)
  *H10N 50/85* (2023.01)
  *H10N 52/85* (2023.01)

(52) U.S. Cl.
  CPC ......... *H01F 10/3286* (2013.01); *H10B 61/20* (2023.02); *H10N 50/10* (2023.02); *H10N 50/85* (2023.02); *H10N 52/85* (2023.02)

(58) Field of Classification Search
  USPC .......................................................... 365/158
  See application file for complete search history.

(56) References Cited

U.S. PATENT DOCUMENTS

| | | | | |
|---|---|---|---|---|
| 7,859,034 B2 * | 12/2010 | Huai | ...................... | B82Y 10/00 |
| | | | | 257/295 |
| 7,875,958 B2 * | 1/2011 | Cheng | .................. | H10D 10/881 |
| | | | | 257/190 |
| 7,973,349 B2 * | 7/2011 | Huai | ................... | H01F 10/3254 |
| | | | | 257/295 |
| 8,173,447 B2 * | 5/2012 | Ueda | ...................... | H10N 50/10 |
| | | | | 257/E21.28 |
| 8,217,478 B2 * | 7/2012 | Lou | ........................ | B82Y 25/00 |
| | | | | 365/158 |
| 8,379,352 B1 * | 2/2013 | Braganca | ........... | G01R 33/1284 |
| | | | | 365/171 |
| 9,007,818 B2 * | 4/2015 | Sandhu | ................... | G11C 11/15 |
| | | | | 365/158 |
| 9,368,176 B2 * | 6/2016 | Shukh | .................. | G01R 33/098 |
| 10,127,956 B2 * | 11/2018 | Lee | ........................ | H10N 50/80 |
| 10,461,243 B2 * | 10/2019 | Chia | ...................... | H01F 10/329 |
| 11,162,894 B2 * | 11/2021 | Tankhilevich | ............ | H01S 1/02 |
| 11,322,190 B2 * | 5/2022 | Kim | ...................... | H10N 52/00 |
| 11,387,405 B2 * | 7/2022 | Zhu | ........................ | H10B 61/20 |
| 11,411,368 B2 * | 8/2022 | Tankhilevich | ........ | G11C 11/161 |
| 11,793,086 B2 * | 10/2023 | Wang | ..................... | H10N 50/85 |
| | | | | 257/421 |
| 11,980,039 B2 * | 5/2024 | Marchack | .............. | H10B 61/00 |
| 12,096,698 B2 * | 9/2024 | Habiboglu | ............ | G11C 11/161 |
| 2011/0002163 A1 * | 1/2011 | Fukami | ................ | G11C 11/161 |
| | | | | 365/173 |
| 2024/0120923 A1 * | 4/2024 | Han | .................... | G11C 11/1659 |

FOREIGN PATENT DOCUMENTS

| | | | | |
|---|---|---|---|---|
| JP | 2024115536 A | * | 8/2024 | ............. G06F 7/588 |
| KR | 20140120920 A | * | 10/2014 | ........... G11C 11/161 |

* cited by examiner

MAGNON JUNCTION, MAGNON RANDOM ACCESS MEMORY, MAGNON MICROWAVE OSCILLATOR AND DETECTOR, ELECTRONIC DEVICE

CROSS-REFERENCE

The present disclosure claims a benefit of, and priority to Chinese Patent Disclosure No. 202310147344.4 filed on Feb. 14, 2023, the disclosure of which is hereby expressly incorporated by reference herein in its entirety.

TECHNICAL FIELD OF THE DISCLOSURE

The present disclosure generally relates to the field of magnon devices, and more specifically, relates to a magnon junction and its operation method, a magnon random access memory (mRAM) comprising the magnon junction, a magnon microwave oscillator, a magnon microwave detector, a magnon random number generator, a magnon probability-bit (i.e., p-bit) random number generator, and any one or more electronic devices comprising these devices.

BACKGROUND

Figure 1:
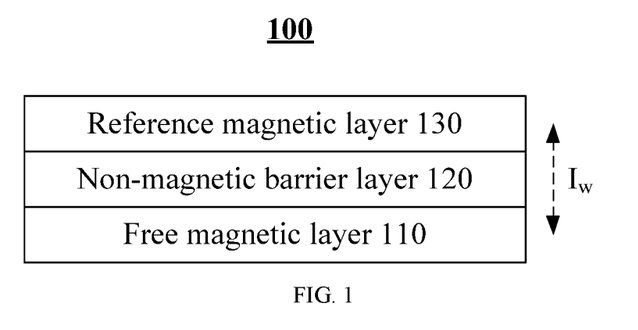
FIG. 1 is a schematic diagram of a structure of a prior magnetic tunnel junction (MTJ).

FIG. 1 shows an example of a magnon storage unit 100 based on a conventional magnon tunneling junction (MTJ). Referring to FIG. 1, the magnon storage unit 100 comprises a free magnetic layer 110, a non-magnetic barrier layer 120, and a reference magnetic layer 130, wherein the free magnetic layer 110 has a free magnetic moment, the reference magnetic layer 130 has a relatively fixed magnetic moment which is pinned, and the non-magnetic barrier layer 120 is generally formed by metal oxide insulator materials such as MgO, $Al_2O_3$, MgAlO, etc. When the magnetic moment of the free magnetic layer 110 and that of the reference magnetic layer 130 are arranged in parallel, the magnon storage unit 100 has a smaller resistance, which can correspond to a storage bit "0"; and when the magnetic moment of the free magnetic layer 110 and that of the reference magnetic layer 130 are arranged in antiparallel, the magnon storage unit 100 has a larger resistance, which can correspond to a storage bit "1", or vice versa. When data is written to the magnon storage unit 100, a vertical writing current $I_w$ can be applied to change a direction of the magnetic moment of the free magnetic layer 110 through the spin transfer torque (STT) effect.

A problem regarding the STT writing method lies in that in order to change the direction of the magnetic moment of the free magnetic layer 110, the vertical writing current $I_w$ needs to have a higher current density, and therefore, the non-magnetic barrier layer 120 must be very thin to reduce resistance. On the other hand, when the non-magnetic barrier layer 120 is very thin, a leakage current will be generated during the reading operation due to a tunneling effect. When the array of storage units is large and the reading speed is high, the total amount of leakage current generated is very large, which affects the practical application of a STT type magnon random access memory. Meanwhile, the ultra-thin non-magnetic barrier layer 120 is also prone to breakdown during prolonged repeated erasing and writing, resulting in short circuits and chip failure, which significantly affects the lifespan of the chip. The ultra-thin non-magnetic barrier layer 120 also increases the manufacturing difficulty of maintaining uniformity and consistency in high-capacity storage units.

Therefore, there is still a need to improve magnon storage units to overcome one or more of the aforementioned issues.

SUMMARY

From a physical perspective, in addition to electrons acting as spin carriers, particles such as magnons, neutrons, or other quasi particles can also carry spin angular momentum. In particularly, the research on the spin of magnons has recently aroused widespread interest among researchers. Magnons are quasi particles of spin waves, representing the collective excited states of coherent electron spin systems in magnon ordered systems. Each quantized magnon carries a reduced Planck constant spin angular momentum. The fluctuation of magnons also provides some functions that conventional electron-based spin devices cannot achieve, such as providing long-distance spin information transfer without Joule heating, which can greatly reduce the power consumption of spin devices. In addition, the magnetic moment can also be definitively switched by the magnon transfer torque, which has great potential for application in the field of information storage.

One aspect of the present disclosure is to provide a magnon junction that can utilize magnons to assist in magnetic moment switching, thereby overcoming one or more problems present in conventional switching methods. The present disclosure also provides various devices based on the magnon junction, such as a magnon random access memory, a magnon microwave oscillator, a magnon microwave detector, a magnon random number generator, a magnon p-bit random number generator, etc., as well as an electronic device comprising any one or more of these devices.

According to an exemplary embodiment, a magnon junction (MJ) is provided, comprising: a first electrode layer formed by a non-magnetic conductive material; a free magnetic layer arranged on the first electrode layer and formed by a ferromagnetic conductive material; an antiferromagnetic barrier layer arranged on the free magnetic layer and formed by an antiferromagnetic insulator (AFI) material; a reference magnetic layer arranged on the antiferromagnetic barrier layer and formed by a ferromagnetic conductive material; and a second electrode layer arranged on the reference magnetic layer and formed by a non-magnetic conductive material, wherein the reference magnetic layer has perpendicular magnetic anisotropy or a vertical magnetic moment component, a magnetic moment direction of which is fixed along a perpendicular direction, and the free magnetic layer has perpendicular magnetic anisotropy or a perpendicular magnetic moment component, a magnetic moment direction of which can be switched in the perpendicular direction, and wherein the antiferromagnetic barrier layer has vertical magnetic anisotropy or a perpendicular magnetic moment component, and there is an exchange coupling at an interface between the antiferromagnetic barrier layer and the ferromagnetic conductive materials; and when a magnetic moment of the free magnetic layer is flipped, the magnetic moment of the antiferromagnetic barrier layer is also switched, thereby reducing a current density required to flip the magnetic moment of the free magnetic layer.

In an example, the first electrode layer and the second electrode layer are configured to apply a perpendicular flipping current, which is spin polarized when flowing through the reference magnetic layer; at an interface between the reference magnetic layer and the antiferromagnetic barrier layer, a part of the spin polarized current is converted into a magnon current, which diffuses through the antiferromagnetic barrier layer to be injected into the free magnetic layer, and a magnon transfer torque (MTT) is generated respectively during diffusion and injection; at the same time, another part of the spin polarized current tunnels through the antiferromagnetic barrier layer into the free magnetic layer, whereby under a combined action of the magnon transfer torque MTT generated by the magnon flow and the spin transfer torque STT generated by the spin polarized current, the direction of the magnetic moment of the free magnetic layer is switched.

In an example, when diffusing through the antiferromagnetic barrier layer, the magnon flow also generates a magnon transfer torque MTT to switch directions of magnetic moments on lattice points of the antiferromagnetic barrier layer that are antiparallel to each other, resulting in a direction of a Néel vector of the antiferromagnetic barrier layer and the direction of the magnetic moment of the free magnetic layer to be switched.

In an example, the first electrode layer is formed by a non-magnetic conductive heavy metallic material having a spin Hall effect.

In an example, the first electrode layer is configured to apply a first in-plane switching current which generates a spin polarized current diffusing into the free magnetic layer through the spin Hall effect, and the spin polarized current generates a spin-orbit torque SOT for switching the magnetic moment of the free magnetic layer.

In an example, the first electrode layer and the second electrode layer are further configured to apply a second perpendicular flipping current which is spin polarized when flowing through the reference magnetic layer; at the interface between the reference magnetic layer and the antiferromagnetic barrier layer, a part of the spin polarized current is converted into a magnon current, which diffuses through the antiferromagnetic barrier layer to be injected into the free magnetic layer, and generates a magnon transfer torque MTT; at the same time, another part of the spin polarized current tunnels through the antiferromagnetic barrier layer into the free magnetic layer; the spin polarized current generates a spin transfer torque STT for switching the direction of the magnetic moment of the free magnetic layer, whereby under a combined action of the magnon transfer torque MTT and the spin transfer torque STT generated by the second perpendicular switching current, as well as the spin-orbit torque SOT generated by the first in-plane switching current, the direction of the magnetic moment of the free magnetic layer is switched.

In an example, the ferromagnetic conductive material for forming the reference magnetic layer and the free magnetic layer comprise one or more selected from a group consisting of the following materials: $NiCo_2O_4$, $Fe_3GeTe_2$, $VSe_2$, FePt, FePd, CoPt, CoPd, $[Fe/Pt]_N$, $[Co/Pt]_N$, $[Co/Pd]_N$, FeCr, CoCr, FeTb, CoTb, GdFeCo, TbFeCo, ultra-thin Co—Fe—B, and Co—Fe alloy films, where N is a positive integer greater than or equal to 1.

In an example, the antiferromagnetic insulator material for forming the antiferromagnetic barrier layer comprises one or more selected from a group consisting of the following materials: $Cr_2O_3$, CoO, NiO, FeO, MnO, $MnF_2$, MnS, $FeCl_2$, $GdFeO_3$, $NdFeO_3$, $SmFeO_3$, $BiCoO_3$, $BiNiO_3$, $LaFeO_3$.

In an example, the antiferromagnetic configuration of the antiferromagnetic insulator material for forming the antiferromagnetic barrier layer can be: A-type, wherein a direction of magnetic moment of one lattice point in an original cell is the same as those of two neighboring lattice points, but opposite to that of another neighboring lattice point; B-type, wherein a direction of magnetic moment of a lattice point in an original cell is the same as that of a neighboring lattice point, but opposite to those of another two neighboring lattice points; or C-type, wherein a direction of magnetic moment of one lattice point in an original cell is opposite to those of three neighboring lattice points, or the antiferromagnetic barrier layer has a helical magnetic configuration.

In an example, the non-magnetic conductive heavy metallic material for forming the first electrode layer comprises one or more selected from a group consisting of the following materials: Pt, W, Ta, Pd, Ir, W, Mo, Bi, Pb, Hf, Ru, IrMn, PtMn, AuMn, $Bi_2Se_3$, $Bi_2Te_3$, and the alloy or compound of the above-mentioned elemental heavy metals.

According to an exemplary embodiment, a method for operating a magnon junction is provided, wherein the magnon junction comprises: a first electrode layer formed by a non-magnetic conductive material; a free magnetic layer arranged on the first electrode layer and formed by a ferromagnetic conductive material; an antiferromagnetic barrier layer arranged on the free magnetic layer and formed by an antiferromagnetic insulator material; a reference magnetic layer arranged on the antiferromagnetic barrier layer and formed by a ferromagnetic conductive material; and a second electrode layer arranged on the reference magnetic layer and formed by a non-magnetic conductive material, wherein the reference magnetic layer has perpendicular magnetic anisotropy or a perpendicular magnetic moment component, a magnetic moment direction of which is fixed in a perpendicular direction; the free magnetic layer has perpendicular magnetic anisotropy or a perpendicular magnetic moment component, a magnetic moment direction of which is switchable in the perpendicular direction; and the antiferromagnetic barrier layer has perpendicular magnetic anisotropy or a perpendicular magnetic moment component, wherein there is an exchange coupling at an interface between the antiferromagnetic barrier layer and the ferromagnetic conductive materials, and when a magnetic moment of the free magnetic layer is switched, a magnetic moment of the antiferromagnetic barrier layer is also switched, thereby reducing a current density required for switching the magnetic moment of the free magnetic layer; wherein the method comprises: applying a perpendicular switching current currenting perpendicularly through the magnon junction using the first electrode layer and the second electrode layer, wherein the perpendicular switching current is spin polarized when currenting through the reference magnetic layer; at an interface between the reference magnetic layer and the antiferromagnetic barrier layer, a part of a spin polarized current is converted into a magnon current, which diffuses through the antiferromagnetic barrier layer to be injected into the free magnetic layer, and during the diffusion and injection, a magnon transfer torque MTT is generated respectively; at the same time, another part of the spin polarized current tunnels through the antiferromagnetic barrier layer into the free magnetic layer, whereby under a combined action of the magnon transfer torque MTT generated by the magnon current and a spin transfer torque STT generated by the spin polarized current, a direction of the magnetic moment of the free magnetic layer is switched.

In an example, the first electrode layer is formed by a non-magnetic conductive heavy metallic material having a spin Hall effect, and the method further comprises: applying an in-plane switching current flowing through the first electrode layer, wherein the in-plane switching current generates a spin polarized current diffusing to the free magnetic layer by a spin Hall effect, and the spin polarized current generates a spin-orbit torque SOT for switching the magnetic moment of the free magnetic layer, whereby the direction of the magnetic moment of the free magnetic layer is switched under a combined effect of the magnon transfer torque MTT and spin transfer torque STT generated by the perpendicular switching current, as well as the spin-orbit torque SOT generated by the in-plane switching current.

In an example, the magnon current also generates a magnon transfer torque MTT to flip directions of magnetic moments on different sublattice points of the antiferromagnetic barrier layer which are in antiparallel directions with each other, whereby both a direction of a Néel vector of the antiferromagnetic barrier layer and the direction of the magnetic moment of the free magnetic layer are switched.

According to an exemplary embodiment, a magnon random access memory mRAM is provided, comprising an array formed by multiple magnon storage units, each of which comprises the aforementioned magnon junction.

According to an exemplary embodiment, a magnon microwave oscillator MMO is provided, comprising: the magnon junction, and a current source for applying a current that flows vertically through the magnon junction and generating microwave oscillation signals at both ends of the magnon junction, wherein a magnitude of the current provided by the current source is adjustable to regulate magnitudes of the magnon transfer torque and spin torque MTT+STT in the magnon junction and then regulate a precession frequency and amplitude of a magnetic moment of the free magnetic layer in the magnon junction, thereby controlling a frequency and amplitude of the microwave oscillation signals output at both ends of the magnon junction.

According to an exemplary embodiment, a magnon microwave detector MMD is provided, comprising: the aforementioned magnon junction, wherein a magnetic moment of the magnon junction precesses with an alternating electromagnetic field generated by an external microwave signal; a current source for applying a detection current perpendicularly flowing through the magnon junction to generate microwave oscillation signals at both ends of the magnon junction, wherein a frequency and amplitude of the microwave oscillation signal depend on a frequency and intensity of the external microwave signal, respectively; and a signal analysis module for detecting the frequency and amplitude of the microwave oscillation signal to determine the frequency and intensity of the external microwave signal.

According to an exemplary embodiment, a magnon random number generator MRNG is provided, comprising: the aforementioned magnon junction, and a current source for applying a consecutive current vertically flowing through the magnon junction, wherein the consecutive current has a predetermined current density to reduce a barrier height between parallel and antiparallel states of the magnon junction, to achieve random switching under thermal disturbance and thus output random signals at both ends of the magnon junction.

According to an exemplary embodiment, a magnon p-bit random number generator MRNG is provided, comprising: the aforementioned magnon junction, and a current source for applying a consecutive current vertically flowing through the magnon junction, wherein the consecutive current has a predetermined current density to reduce a barrier height between parallel and antiparallel states of the magnon junction, to achieve random switching under thermal disturbance, thereby outputting a random signal at both ends of the magnon junction, and adjusting a magnitude of the magnon transfer torque or spin transfer torque by adjusting a magnitude of the consecutive current, then changing a probability of generating parallel and antiparallel states, to achieve a probability adjustable random number generator.

According to an exemplary embodiment, there is provided an electronic device comprising at least one of the magnon random access memory, the magnon microwave oscillator, the magnon microwave detector, the magnon random number generator, and the magnon p-bit random number generator.

The above and other features and advantages of the present disclosure will become apparent from the description of exemplary embodiments in conjunction with the accompanying drawings below.

DETAILED DESCRIPTION

Exemplary embodiments of the present disclosure will be described below with reference to the accompanying drawings. It is noted that the figures may not be drawn to scale.

Figure 2:
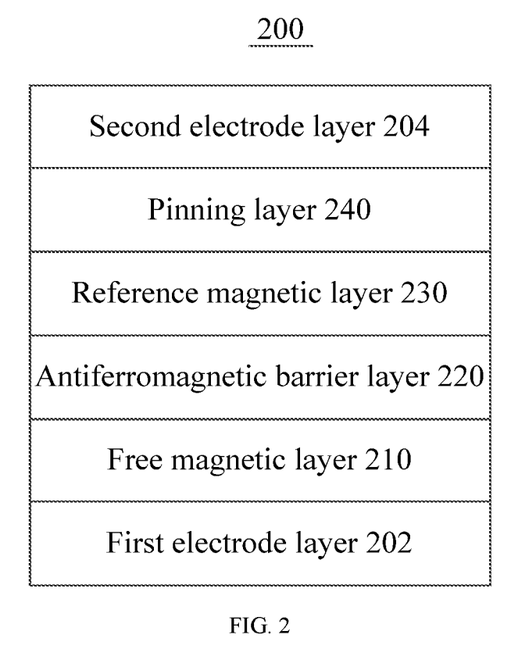
FIG. 2 is a schematic diagram of a structure of a magnon junction according to an exemplary embodiment of the present disclosure.

FIG. 2 is a schematic diagram of a structure of a magnon junction 200 according to an exemplary embodiment of the present disclosure. As shown in FIG. 2, the magnon junction 200 may comprise a first electrode layer 202, a free magnetic layer 210, an antiferromagnetic barrier layer 220, a reference magnetic layer 230, a pinning layer 240, and a second electrode layer 204.

Figure 3:
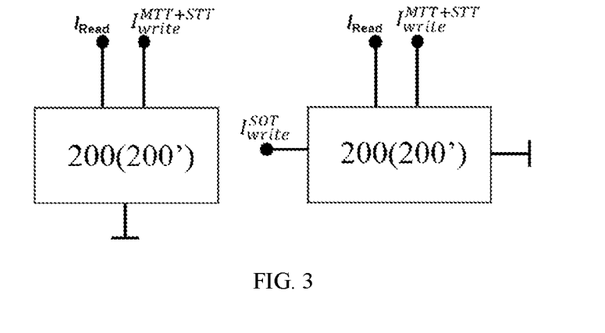
FIG. 3 is a schematic diagram of a structure of a magnon junction according to another exemplary embodiment of the present disclosure.

FIG. 3 is a schematic diagram of a structure of a magnon junction 200' according to another exemplary embodiment of the present disclosure. As shown in FIG. 3, the magnon junction 200' may comprise a second electrode layer 204, a pinning layer 240, a reference magnetic layer 230, an antiferromagnetic barrier layer 220, a free magnetic layer 210, and a first electrode layer 202. FIG. 3 also shows that the magnon junction 200' (or magnon junction 200) can be used as a two-terminal device (bottom left) and a three-terminal device (bottom right). When used as a two-terminal device, a reading current $I_{read}$ and a vertical writing current $I_{write}^{MTT+STT}$ that flow vertically through the magnon junction 200' can be applied. When used as a three-terminal device, a reading current Iread and a vertical writing current $I_{write}^{MTT+STT}$ that flow vertically through the magnon junction 200' can be applied; in addition, an in-plane writing current $I_{write}^{SOT}$ flowing through the first electrode layer (i.e. the spin Hall effect SHE layer) can be applied.

Therefore, it can be seen from FIGS. 2 and 3 that the terms regarding spatial relationship such as up, down, etc. in the present disclosure only represent relative spatial relationships and do not intend to define any absolute direction. For simplicity, only the magnon junction 200 will be mentioned in the following, but it should be understood that it also comprises the magnon junction 200'. In addition, similar to the conventional magnon tunneling junction (MTJ), the structure of magnon junction 200 can also have many variations, which will not be described one by one here. In addition, according to the principle of switching the free layer, it can be divided into MTT+STT two-terminal device and MTT+STT+SOT three-terminal device, which will be further described in detail below.

Figure 4:
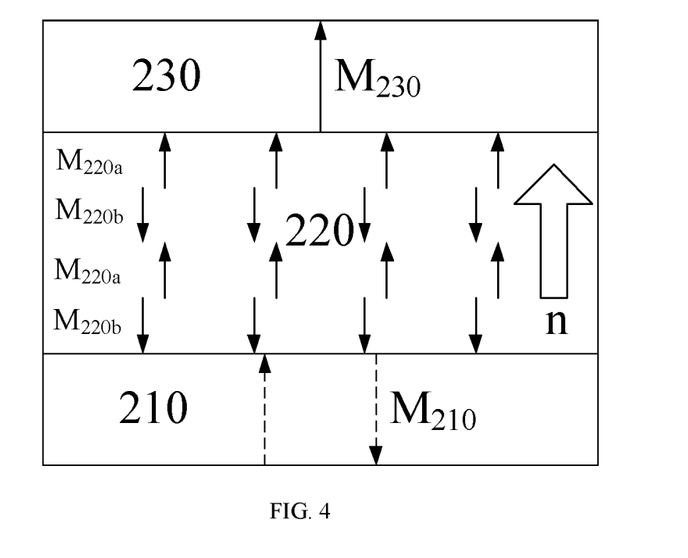
FIG. 4 is a schematic diagram of a magnetic moment direction in a magnon junction according to an exemplary embodiment of the present disclosure.

FIG. 4 illustrates the directions of magnetic moments of the free magnetic layer 210, antiferromagnetic barrier layer 220, and reference magnetic layer 230. As shown in FIG. 4, the reference magnetic layer 230 has perpendicular magnetic anisotropy, and a direction of its magnetic moment $M_{230}$ can be fixed and kept unchanged along the vertical direction. It can be understood that the pinning layer 240 can be used to pin the direction of the magnetic moment $M_{230}$ of the reference magnetic layer 230 in the vertical direction, and such pinning layer 240 can be formed by an antiferromagnetic material such as IrMn. In other embodiments, the reference magnetic layer 230 may also be a self-pinning structure, for example, it may comprise an artificial antiferromagnetic structure, in which case the pinning layer 240 may also be omitted.

The free magnetic layer 210 can also have perpendicular magnetic anisotropy, and a direction of its magnetic moment $M_{210}$ can be switched in the perpendicular direction, so that it is arranged to be parallel or antiparallel to the magnetic moment $M_{230}$ of the reference magnetic layer 230, which correspond to the low and high resistance states of the magnon junction 200, respectively. Therefore, utilizing this characteristic, the magnon junction 200 can be used as a storage device.

The antiferromagnetic barrier layer 220 has perpendicular magnetic anisotropy too, and in the vertical direction, as shown in FIG. 4, the antiferromagnetic barrier layer 220 has directions of magnetic moments arranged antiparallel to each other on the lattice points, such as a perpendicular upward direction of magnetic moment $M_{220a}$ and a perpendicular downward direction of magnetic moment $M_{220b}$, so its macroscopic magnetic moment is substantially zero. FIG. 4 also shows a Néel vector n of the antiferromagnetic barrier layer 220.

Although the directions of the magnetic moments of the free magnetic layer 210, antiferromagnetic barrier layer 220, and reference magnetic layer 230 each are shown vertically upwards or downwards in FIG. 4, it should be understood that they can be inclined, with an angle of inclination within 60 degrees, preferably within 45 degrees, or more preferably within 30 degrees. In other words, the free magnetic layer 210, antiferromagnetic barrier layer 220, and reference magnetic layer 230 each have perpendicular magnetic anisotropy with in-plane components. The tilted magnetic anisotropy of the free magnetic layer 210 and the antiferromagnetic barrier layer 220 contribute to switching magnetic moments at lower currents, avoiding the need for an external bias magnon field, which will be further explained below.

Each of the free magnetic layer 210 and the reference magnetic layer 230 can be formed by a ferromagnetic conductive material, such as a ferromagnetic conductive material that meet the above settings and can be selected from a group consisting of but are not limited to $NiCo_2O_4$, $Fe_3GeTe_2$, $VSe_2$, FePt, FePd, CoPt, CoPd, $[Fe/Pt]_N$, $[Co/Pt]_N$, $[Co/Pd]_N$, FeCr, CoCr, FeTb, CoTb, GdFeCo, TbFeCo, ultra-thin Co—Fe—B, and Co—Fe alloy films, where N is a positive integer greater than or equal to 1.

The antiferromagnetic barrier layer 220 can be formed by an antiferromagnetic insulator material, such as an antiferromagnetic insulator material that meet the above settings and can be selected from a group consisting of but is not limited to $Cr_2O_3$, CoO, NiO, FeO, MnO, $MnF_2$, MnS, $FeCl_2$, $GdFeO_3$, $NdFeO_3$, $SmFeO_3$, $BiCoO_3$, $BiNiO_3$, $LaFeO_3$. In an exemplary embodiment, the antiferromagnetic configuration of the antiferromagnetic insulator material forming the antiferromagnetic barrier layer 220 can be: A-type, wherein a direction of magnetic moment of one lattice point in the original cell is the same as those of two neighboring lattice points, but opposite to that of another neighboring lattice point; B-type, wherein a direction of magnetic moment of a lattice point in the original cell is the same as that of a neighboring lattice point, but opposite to those of another two neighboring lattice points; or C-type wherein a direction of magnetic moment of one lattice point in the original cell is opposite to those of three neighboring lattice points. In another exemplary embodiment, the antiferromagnetic barrier layer 220 may also have a helical magnetic configuration.

It should be noted that achieving good perpendicular magnetic anisotropy is important for the present disclosure. Therefore, the selection of the material for the free magnetic layer 210, antiferromagnetic barrier layer 220, and reference magnetic layer 230 is important. Not only should the material itself be able to form the desired perpendicular magnetic anisotropy through appropriate deposition processes or appropriate post-processing processes such as thermal annealing in a magnetic field, but also the degree of matching, for example, lattice matching, interdiffusion, etc. between materials should be considered, which are expected to form high-quality layer structures and clear layer interfaces. It has been found by experiments that when $Cr_2O_3$ is chosen to form the antiferromagnetic barrier layer 220, and $NiCo_2O_4$ is chosen to form the free magnetic layer 210 and the reference magnetic layer 230, multi-layer film structures of a ferromagnetic layer and the antiferromagnetic barrier layer of better quality with perpendicular magnetic anisotropy can be obtained, and thus it is preferred.

The first electrode layer 202 and the second electrode layer 204 may be formed by a non-magnetic metallic material with good conductivity, wherein the electrode layer formed above also preferably has a good corrosion resistance to protect the layer located there below. An example of such non-magnetic metallic material can be one chosen from a group consisting of but is not limited to Pt, Ta, etc.

In some embodiments, the first electrode layer 202 in contact with the free magnetic layer 210 may also be formed by a non-magnetic conductive heavy metallic material having a spin Hall effect, an example of which can be one chosen from a group consisting of but are not limited to Pt, W, Ta, Pd, Ir, W, Mo, Bi, Pb, Hf, IrMn, PtMn, AuMn, $Bi_2Se_3$, $Bi_2Te_3$.

The operation method of the magnon junction 200 will be described in following. In a first method, the first electrode layer 202 and the second electrode layer 204 can be used for applying a switching current (also known as a writing current) $I_w$ that flows vertically through the magnon junction 200. The direction of the magnetic moment of the free magnetic layer 210 can be switched under the combined action of the magnon transfer torque (MTT) and the spin transfer torque (STT) induced by the switching current $I_w$, which will be described with reference to FIGS. 5A, 5B, 6A, and 6B.

Figure 5A:
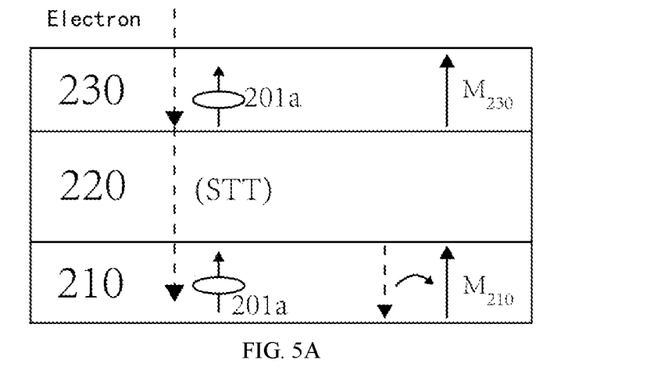
FIGS. 5A and 5B are schematic diagrams of a principle of a spin transfer torque (STT) switching when a vertical switching current is applied.

Firstly, referring to FIG. 5A, the perpendicular switching current $I_W$ is spin polarized when currenting through the reference magnetic layer 230, and thus generates a spin polarized current and tunnels into the free magnetic layer 210 through the antiferromagnetic barrier layer 220. The spin polarized current generates a spin transfer torque (STT) for switching the direction of the magnetic moment of the free magnetic layer 210. In the case of the perpendicular downward switching current $I_W$ shown in FIG. 5A (represented by "electrons" in FIG. 5A, where the current can be understood as electron current; and if the current direction is understood to be opposite to the electron flow direction, the illustrated current direction can be reversed), the switching current $I_W$ first obtains a spin angular momentum 201a in the reference magnetic layer 230, which has the same direction as the direction of the magnetic moment M230 of the reference magnetic layer 230, thereby generating a spin polarized current, and when the spin polarized current tunnels into the free magnetic layer 210, the spin angular momentum 201a interacts with the magnetic moment $M_{210}$ of the free magnetic layer 210. Due to the conservation of angular momentum, a spin transfer torque is generated on the magnetic moment $M_{210}$ of the free magnetic layer 210, causing its magnetic moment direction to be close to that of the reference magnetic layer 230, thereby switching the magnetic moment $M_{210}$ of the free magnetic layer 210 into the same direction as that of the magnetic moment $M_{230}$ of the reference magnetic layer 230.

Figure 5B:
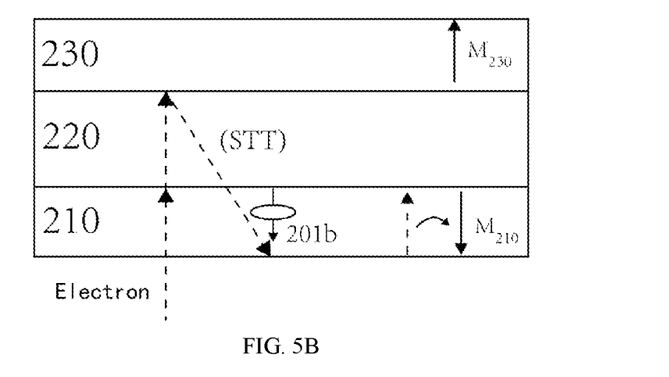

FIG. 5B shows a situation of applying a perpendicularly upward switching current $I_w$. Due to the filtering and reflection effect on spin at the interface of the reference magnetic layer 230, a part of the spin polarized current whose direction of the spin angular momentum 201a is the same as the direction of the magnetic moment $M_{230}$ of the reference magnetic layer 230 is transmitted into the reference magnetic layer 230, and the other part of the spin polarized current whose direction of a spin angular momentum 201b is opposite to the direction of the magnetic moment $M_{230}$ of the reference magnetic layer 230 is reflected into the free magnetic layer 210, enabling the magnetic moment $M_{210}$ of the free magnetic layer 210 to be subjected to a spin transfer torque in the opposite direction and thus to be switched in the opposite direction to the magnetic moment $M_{230}$ of the reference magnetic layer 230.

Figure 6A:
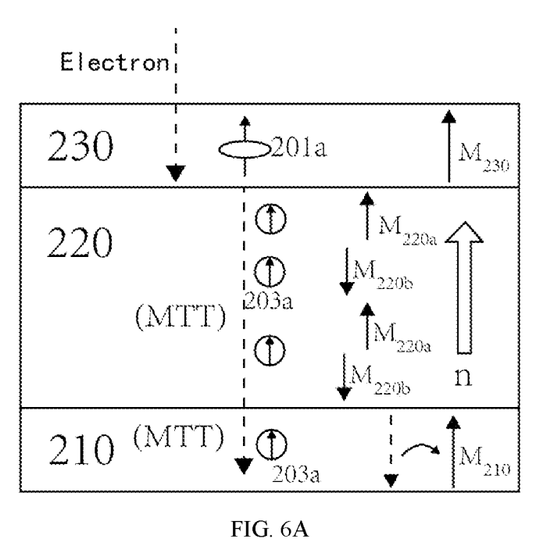
FIGS. 6A and 6B are schematic diagrams of a principle of a magnon transfer torque (MTT) switching when a vertical switching current is applied.

As shown in FIG. 6A, the vertically downward switching current $I_w$ obtains the spin angular momentum 201a in the reference magnetic layer 230, which has the same direction as the direction of the magnetic moment $M_{230}$ of the reference magnetic layer 230, and then it is scattered at the interface between the reference magnetic layer 230 and the antiferromagnetic barrier layer 220, transferring the angular momentum to the antiferromagnetic barrier layer 220 to form a magnon current 203a having an angular momentum whose direction is the same as the direction of the magnetic moment $M_{230}$ of the reference magnetic layer 230. The magnon current 203a can diffuse into the free magnetic layer 210 through the antiferromagnetic barrier layer 220, interact with the magnetic moment $M_{210}$ of the free magnetic layer 210, and due to the conservation of angular momentum, the magnon current 203a can generate a magnon transfer torque acting on the magnetic moment $M_{210}$ of the free magnetic layer 210, forcing its magnetic moment direction to approach the direction of the magnetic moment of the reference magnetic layer 230, thereby switching the magnetic moment M210 of the free magnetic layer 210 into the same direction as that of the magnetic moment $M_{230}$ of the reference magnetic layer 230.

It should also be noted that the magnon current 203a further generates a magnon transfer moment acting on the magnetic moment $M_{220}$(comprising $M_{220a}$ and $M_{220b}$) of the antiferromagnetic barrier layer 220, forcing the direction of its magnetic moment to flip, as shown by a Néel vector n in FIG. 6A. Due to the exchange coupling between the antiferromagnetic barrier layer 220 and the free magnetic layer 210, the magnetic moment switching of the antiferromagnetic barrier layer 220 can also promote or drive the magnetic moment switching of the free magnetic layer 210, thereby reducing the current density required for switching the magnetic moment of the free magnetic layer 210.

Figure 6B:
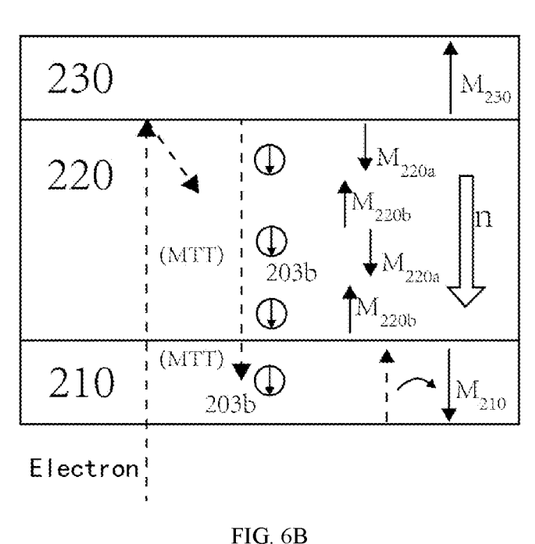

Continuing with reference to FIG. 6B, due to spin transmission and emission effects of the perpendicularly upward switching current Iw and at the interface of the reference magnetic layer 230, a part of the spin polarized current whose spin angular momentum 201a is in the same direction as the direction of the magnetic moment $M_{230}$ of the reference magnetic layer 230 transmits into the reference magnetic layer 230, and the other part of the spin polarized current whose spin angular momentum 201b has an opposite direction to the direction of the magnetic moment $M_{230}$ of the reference magnetic layer 230, is reflected into the antiferromagnetic layer 220 and the free magnetic layer 210, obtaining the spin angular momentum 201b opposite to the direction of the magnetic moment $M_{230}$ of the reference magnetic layer 230 (refer to FIG. 5B); it transmits into the antiferromagnetic barrier layer 220 to form a magnon current 203b with an angular momentum opposite to the direction of the magnetic moment $M_{230}$ of the reference magnetic layer 230. The magnon current 203b can diffuse back into the free magnetic layer 210 through the antiferromagnetic barrier layer 220 and interact with the magnetic moment M210 of the free magnetic layer 210. Due to the conservation of angular momentum, a magnon transfer torque in the opposite direction acting on the magnetic moment $M_{210}$ of the free magnetic layer 210 is generated, thereby switching the magnetic moment $M_{210}$ of the free magnetic layer 210 into the direction opposite to the magnetic moment $M_{230}$ of the reference magnetic layer 230.

It should also be noted that the magnon current 203b also generates a magnon transfer torque acting on the magnetic moment $M_{220}$ (comprising $M_{220a}$ and $M_{220b}$) of the antiferromagnetic barrier layer 220, forcing its magnetic moment direction to flip, as shown by a Néel vector n in FIG. 6B. Similarly, due to the exchange coupling between the antiferromagnetic barrier layer 220 and the free magnetic layer 210, the magnetic moment switching of the antiferromagnetic barrier layer 220 can also promote or drive the magnetic moment switching of the free magnetic layer 210, thereby reducing the current density required for switching the magnetic moment of the free magnetic layer 210.

As shown above with reference to FIGS. 5A, 5B, 6A, and 6B, due to the use of the magnetic anisotropy settings of the antiferromagnetic barrier layer 220 and related layers, the perpendicular switching current Iw can simultaneously induce the spin transfer torque (STT) and the magnon transfer torque (MTT), and under their combined action, the direction of the magnetic moment of the free magnetic layer 210 is switched, thereby reducing the required density for the switching current. By changing the direction of the vertical switching current $I_w$, the magnetic moment of the free magnetic layer 210 can be switched to the desired direction, and the operation is simple. In addition, the magnetic moment of the antiferromagnetic barrier layer 220 can be switched together with the magnetic moment of the free magnetic layer 210, which reduces the switching barrier height caused by the coupling effect of the antiferromagnetic barrier layer 220 and can further reduce the switching current density. When the required switching current density decreases, the antiferromagnetic barrier layer 220 can relatively increase in thickness, which avoids the pinhole effect in turn and prevents excessive leakage current that cannot withstand in the antiferromagnetic barrier layer 220 in terms of the chip design. This is very advantageous when magnon junctions are used as storage unit devices.

When the first electrode layer 202 in contact with the free magnetic layer 210 is formed by a non-magnetic conductive heavy metallic material having the spin Hall effect, an in-plane switching current applied along the first electrode layer 202 can also be used to assist in switching the direction of the magnetic moment of the free magnetic layer 210, which is referred to as the second method, and will be described in detail below with reference to FIGS. 7A and 7B.

Figure 7A:
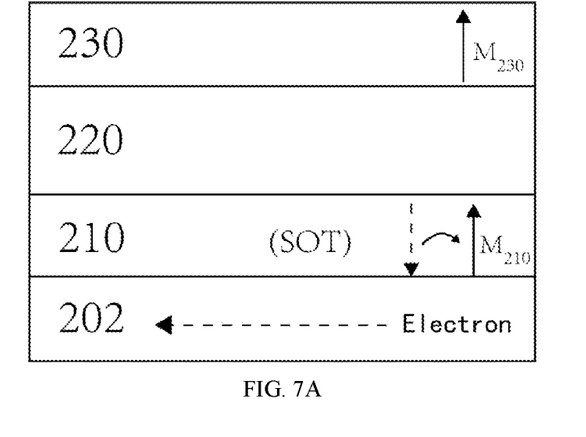
FIGS. 7A and 7B are schematic diagrams of a principle of a spin-orbit moment (SOT) switching when an in-plane switching current is applied.

Firstly, referring to FIG. 7A, when an in-plane switching current $I_w$ is applied along the first electrode layer 202 (the direction is toward left in FIG. 7A), due to the spin Hall effect, a spin polarized current is generated on the surface of the first electrode layer 202 and diffuses into the free magnetic layer 210, and a spin-orbit moment is applied to the magnetic moment $M_{210}$ of the free magnetic layer 210 in the example in FIG. 7A, switching the magnetic moment $M_{210}$ of the free magnetic layer 210 to be the same as the direction of the magnetic moment $M_{230}$ of the reference magnetic layer 230.

Figure 7B:
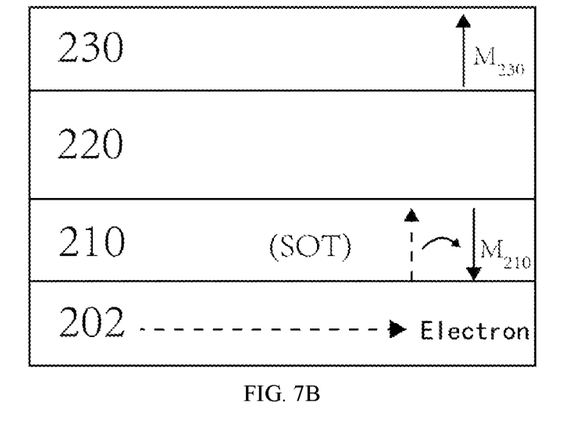

Continuing with reference to FIG. 7B, when an in-plane switching current $I_w$ in the opposite direction is applied along the first electrode layer 202 (the direction is toward right in FIG. 7B), the in-plane switching current $I_w$ generates a spin polarized current with opposite electron polarization directions and diffuses into the free magnetic layer 210, thereby applying a spin-orbit torque in the opposite direction to the magnetic moment $M_{210}$ of the free magnetic layer 210, and then in the example of FIG. 7B, switching the magnetic moment $M_{210}$ of the free magnetic layer 210 to be opposite to the direction of the magnetic moment $M_{230}$ of the reference magnetic layer 230.

Furthermore, it should be understood that in the processes shown in FIGS. 7A and 7B, the generated spin polarized current can also diffuse to the interface of the antiferromagnetic barrier layer 220, thereby transferring spin angular momentums into the antiferromagnetic barrier layer 220 and thus generating a magnon current. The magnon current can generate a magnon transfer moment (MTT) to flip the magnetic moment of the antiferromagnetic barrier layer 220, as shown in FIGS. 6A and 6B. As mentioned earlier, due to the exchange coupling between the antiferromagnetic barrier layer 220 and the free magnetic layer 210, the magnetic moment switching of the antiferromagnetic barrier layer 220 can also promote or drive the magnetic moment switching of the free magnetic layer 210, thereby reducing the current density required for switching the magnetic moment of the free magnetic layer 210.

The first to second operation methods above are both used to flip the direction of the magnetic moment of the free magnetic layer 210, thereby changing the resistance state of the magnon junction 200, that is, changing the data bits stored in the magnon junction 200. Therefore, they can also be referred to as the writing method. In some embodiments, the first and second writing methods mentioned above can also be used simultaneously to flip the magnetic moment of the free magnetic layer 210 in the magnon junction 200, that is, using both the vertical switching current and the in-plane switching current to synergistically flip the magnetic moment of the free magnetic layer 210. This can be referred to as a third writing/switching method, and its principle will not be repeated here.

A reading method of the magnon junction 200 is similar to that of a conventional magnon tunneling junction (MTJ), which can read the resistance state of magnon junction 200 by applying a vertical reading current, thereby reading the data stored therein. A current density of the reading current can be much smaller than the current density of the switching current (i.e. the writing current), so it will not change the direction of the magnetic moment of the free magnetic layer 210 in the magnon junction 200.

Figure 8:
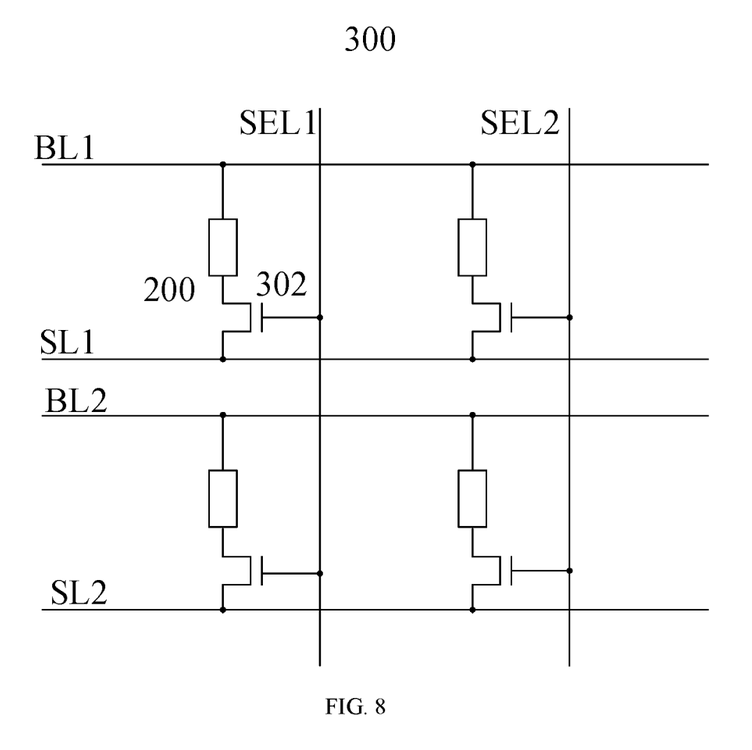
FIG. 8 is a schematic diagram of a structure of a storage unit array of a magnon random access memory according to an exemplary embodiment of the present disclosure.
Figure 9:
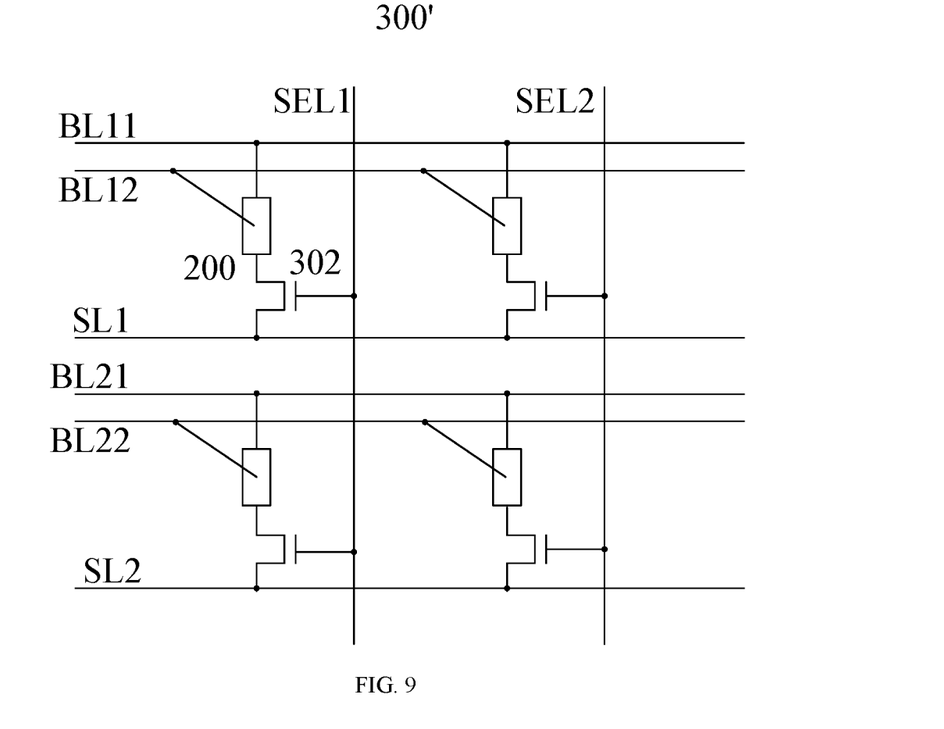
FIG. 9 is a schematic diagram of a structure of a storage unit array of a magnon random access memory according to another exemplary embodiment of the present disclosure.

An embodiment of the present disclosure also provides a magnon random access memory (mRAM), which may comprise an array of magnon storage units formed by the magnon junction 200 described above. FIG. 8 shows a magnon storage unit array 300 comprising magnon junctions 200 as two-terminal devices, where a current/voltage is only applied at the upper and lower ends of the magnon junction 200 to perform related access operations. FIG. 9 shows a magnon storage unit array 300' comprising magnon junctions 200 (as shown in FIG. 3) as three-terminal devices, where in addition to applying current/voltage at the upper and lower ends of the magnon junction 200, an in-plane current can also be applied to the spin Hall effect (SHE) layer (i.e. the non-magnetic conductive heavy metallic layer) in the magnon junction 200 to perform related access operations.

Firstly, referring to FIG. 8, set a word line BLn and a power line SLn for each row of the array (where n represents a row number), and set a selection line SELp for each column of the array (where p represents a column number). One electrode layer of the magnon junction 200 is connected to the word line BLn, and the other electrode layer is connected to the power line SLn through the switching transistor 302. The control gate of the switching transistor 302 is connected to the selection line SELp. When performing a writing operation on the magnon junction 200, for example, in the first row and first column, a writing current is applied through the first row line BL1 and power line SL1, and a voltage is applied on the first column selection line SEL1 to turn on the first column switching transistor 302, thereby completing the writing operation on the magnon junction 200 in the first row and first column. That is to say, the first operation method discussed above is used to perform a writing operation on the magnon junction 200. Similarly, when performing a reading operation on the magnon junction 200, for example, in the first row and first column, a reading current is applied through the first row line BL1 and power line SL1, and a voltage is applied on the first column selection line SEL1 to turn on the first column switching transistor 302, thereby completing the reading operation on the magnon junction 200 in the first row and first column. The specific principles of writing and reading operations have been discussed in detail above regarding the magnon junction 200, and will not be repeated here. In a similar way, each magnon junction 200 in the array can be individually read and written.

Referring to FIG. 9, when the magnon junction 200 forms a three-terminal device, a first word line BLn1 and a second word line BLn2 (where n represents a row number) and a power line SLn are set for each row of the array, and a selection line SELp (where p represents a column number) is set for each column of the array. One end of the spin Hall effect layer 202 of the magnon junction 200 is connected to the first word line BLn1, and the other end is connected to the power line SLn through the switching transistor 302. The control gate of the switching transistor 302 is connected to the selection line SELp. In addition, the second electrode layer 204 of the magnon junction 200 on an opposite side to the spin Hall effect layer 202 can be connected to the second word line BLn2. When performing a writing operation on a magnon junction 200, such as in the first row and first column, three writing methods can be used. The first writing method is to float the first word line BL11, apply a vertical writing current through the second word line BL12 and the power line SL1, and apply a voltage on the first column selection line SEL1 to open the first column switching transistor 302, thereby completing the writing operation of the magnon junction 200 in the first row and first column. The second method is to float the second line BL12, apply an in-plane writing current through the first word line BL11 and the power line SL1, and apply a voltage on the first column selection line SEL1 to turn on the first column switching transistor 302, thereby completing the writing operation of the magnon junction 200 in the first row and first column. The third writing method is to apply a vertical writing current through the second word line BL12 and the power line SL1, while applying an in-plane writing current through the first word line BL11 and the power line SL1, and applying a voltage on the first column selection line SEL1 to turn on the first column switching transistor 302, whereby the vertical writing current and the in-plane writing current are both used to complete a writing operation of the magnon junction 200 in the first row and column. As these three writing methods have already been discussed in detail about the operation methods of the magnon junction 200 above, they will not be repeated here. When reading the magnon junction 200 for example in the first row and first column, the first word line BL11 may be floated and a reading current may be applied through the second word line BL12 and the power line SL1, and a voltage may be applied on the first column selection line SEL1 to turn on the first column switching transistor 302, thereby completing the reading operation of the magnon junction 200 in the first row and first column. In a similar way, each magnon junction 200 in the array can be individually read and written.

Figure 10:
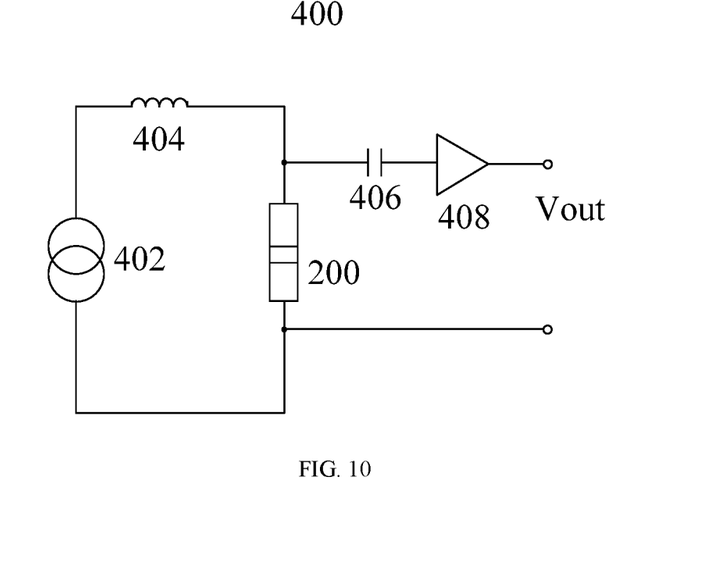
FIG. 10 is a schematic diagram of a structure of a magnon microwave oscillator according to an exemplary embodiment of the present disclosure.

FIG. 10 is a schematic diagram of the structure of a magnon microwave oscillator (MMO) 400 according to an exemplary embodiment of the present disclosure. As shown in FIG. 10, the magnon microwave oscillator 400 may comprise a magnon junction 200 and a current source 402 for applying a current vertically flowing through the magnon junction 200 wherein the current source 402 can be an adjustable current source, and a magnitude of the current provided by it can be adjusted. Inductance 404 may be connected in series with the magnon junction 200 for impedance matching. When the current flows vertically through the magnon junction 200, by controlling the magnitude of the current, the magnetic moment of the free magnetic layer 210 in the magnon junction 200 will not be switched. However, the magnetic moment of the free magnetic layer 210 undergoes precession under the action of the spin transfer torque and magnon transfer torque, thereby outputting microwave oscillation signals at both ends of the magnon junction 200. The magnitude of the current provided by the current source 402 can be adjusted to regulate the magnitude of the magnon transfer torque (MTT) and spin transfer torque (STT) in the magnon junction 200 and then to regulate the frequency and amplitude of the magnetic moment precession of the free magnetic layer 210 in the magnon junction 200, thereby controlling the frequency and amplitude of the microwave oscillation signal output at both ends of the magnon junction 200. As shown in FIG. 10, a capacitor 406 and a signal amplifier 408 can also be connected in parallel at one end of the magnon junction 200, wherein the capacitor 406 is used to filter out the DC component, and the signal amplifier 408 is used to amplify the AC signal (i.e. microwave signal) passing through the capacitor 406, and finally output the microwave signal Vout.

Figure 11:
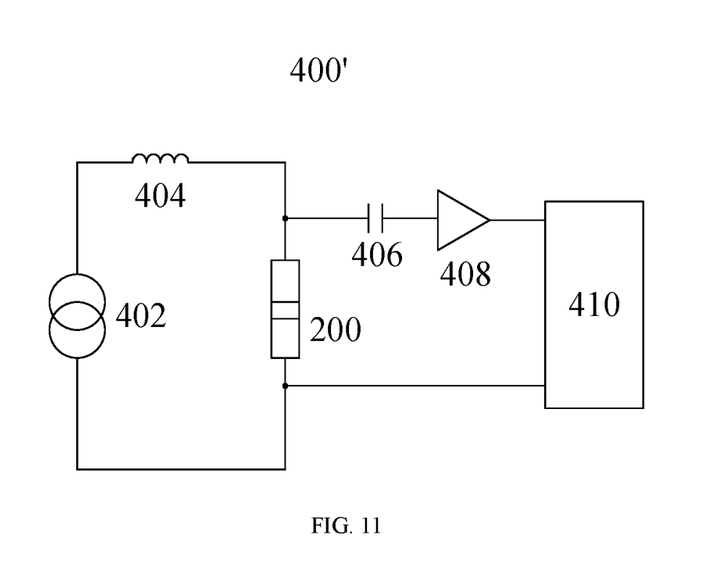
FIG. 11 is a schematic diagram of a structure of a magnon microwave detector according to an exemplary embodiment of the present disclosure.

FIG. 11 is a schematic diagram of the structure of a magnon microwave detector (MMD) 400' according to an exemplary embodiment of the present disclosure. Some elements in the magnon microwave detector 400' are the same as those in the magnon microwave oscillator 400, and thus are marked with the same accompanying drawings, with repeated descriptions omitted.

In the magnon microwave detector 400', the current source 402 provides a small detection current to the magnon junction 200, which hardly causes the magnetic moment precession of the free magnetic layer 210 in the magnon junction 200, and has a specific frequency and amplitude. The magnetic moment of the free magnetic layer 210 of the magnon junction 200 will precess with the alternating electromagnetic field generated by the external microwave signal, thereby generating microwave oscillation signals at both ends of the magnon junction 200, which is provided to the signal analysis module 410 after being filtered by the capacitor 406 and amplified by the signal amplifier 408. The signal analysis module 410 can detect the frequency and amplitude of the microwave oscillation signal, and can also filter out the signal components caused by the detection current provided by the current source 402, obtain the detection signal components generated by the external microwave signal, and ultimately determine the frequency and intensity of the external microwave signal based on the dependency relationship between the frequency and amplitude of the detection signal and the frequency and intensity of the external microwave signal. It should be understood that only some of the main components in the magnon microwave detector 400' which are closely related to the magnon junction 200 of the present disclosure are shown and described here, while other parts are omitted, and can be implemented with reference to the microwave detector of the prior art.

Figure 12:
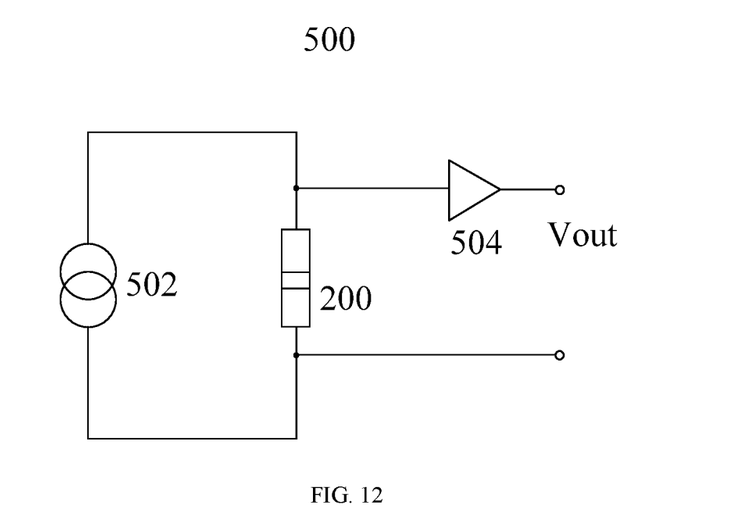
FIG. 12 is a schematic diagram of a structure of a magnon random number generator according to an exemplary embodiment of the present disclosure.

FIG. 12 is a schematic diagram of the structure of a magnon random number generator (MRNG) 500 according to an exemplary embodiment of the present disclosure. As shown in FIG. 12, the magnon random number generator 500 comprises a magnon junction 200 and a current source 502 for applying a consecutive current vertically flowing through the magnon junction 200. In conventional magnetic tunnel junctions (MTJs), as the density of vertical current applied to the MTJ increases, the barrier height between the parallel and antiparallel states of the MTJ decreases. Therefore, within a certain current density range, when the barrier height is small enough, thermal disturbances can cause the MTJ to randomly flip between the parallel and antiparallel states, and output a random signal. The relevant principles can be found in reference document such as J. Y. Qin, X. F. Han et al. Thermally activated magnetization back-hopping based true random number generator in nano-ring magnetic tunnel junctions. Appl. Phys. Lett. 114 (2019) 112401. Similar to the conventional magnetic tunnel junctions, when the density of vertical current applied to magnon junction 200 increases, the barrier height between the parallel and antiparallel states of the magnon junction 200 also decreases. Therefore, the current source 502 can provide a consecutive current with a predetermined current density to the magnon junction 200, in order to reduce the barrier height between the parallel and antiparallel states of the magnon junction 200 and achieve random switching under thermal disturbance, thereby outputting random signals at both ends of the magnon junction 200. After being amplified by the amplifier 504, the random signal is output at the output end Vout.

An exemplary embodiment of the present disclosure further provides a magnon p-bit random number generator (MRNG), which has a structure similar to that of the magnon random number generator (MRNG) 500 shown in FIG. 12, which therefore will not be repeated here. As shown in FIG. 12, the magnitude of the magnon transfer torque or spin transfer torque can be adjusted by adjusting the density of the vertical current applied to the magnon junction 200, so that the magnetic moment of the free magnetic layer 210 tends to flip upwards or downwards, thereby changing the probability of generating parallel and antiparallel states, achieving a random number generator with adjustable probability, that is, to generate random number bits with a predetermined probability. This magnon p-bit random number generator can be applied to the core units of artificial neural networks and algorithm construction.

One aspect of the present disclosure further provides an electronic device, which may comprise one or more of the aforementioned magnon random access memory, magnon microwave oscillator, magnon microwave detector, and magnon random number generator. Examples of such electronic devices comprise but are not limited to mobile phones, laptops, desktop computers, tablets, media players, personal digital assistants, and wearable electronic devices.

Unless required otherwise expressly in the context, in the entire specification and claims, words such as "comprise", "comprising", "include", "including", etc. should be interpreted with an inclusive meaning rather than an exclusive or exhaustive meaning. That is to say, in the sense of "comprising but not limited to". The term "connection" commonly used in this article refers to two or more components that can be directly connected or connected through one or more intermediate components. As commonly used in this article, the term "connection" refers to two or more components that can be directly connected or connected through one or more intermediate components. In addition, when used in this application, the words "herein" "above," "below," and similar words should refer to the entire application rather than any specific part. Where context permits, the word "or" refers to a list of two or more items, which encompasses all interpretations of the word: any item in the list, all items in the list, and any combination of items in the list.

In addition, unless otherwise specified or understood in other ways within the context, the conditional language used in this article, such as "may", "might", "could", "can", "for example", "e.g.", "such as", etc., is typically intended to express that certain embodiments comprise, while other embodiments do not comprise, certain features, elements, and/or states. Therefore, this conditional language is typically not intended to imply that one or more embodiments require features, components, and/or states in any way, or that one or more embodiments must comprise logic, which determines that these features, components, and/or states are comprised or will be executed in any particular embodiment, for making decisions with or without author input or prompts.

Although certain embodiments have been described, these embodiments are presented in an exemplary manner only and are not intended to limit the scope of the present disclosure. In fact, the novel facilities, methods, and systems described in this article can be reflected in various other forms; in addition, without departing from the spirit of this disclosure, various omissions, substitutions, and changes can be made to the forms of the methods and systems described in this article. For example, although blocks are presented in a given arrangement, alternative embodiments may perform functions similar to different components and/or circuit topologies, and some blocks may be deleted, moved, added, subdivided, combined, and/or modified. Each of these blocks can be implemented in various different ways. Any suitable combination of elements and actions of the various embodiments mentioned above can be combined to provide further embodiments. The accompanying claims and their equivalents are intended to cover these forms or modifications that fall within the scope and spirit of this disclosure.

The above description has been provided for the purpose of illustration and description. Furthermore, this description is not intended to limit the embodiments of the present disclosure to the form disclosed herein. Although multiple exemplary aspects and embodiments have been discussed above, those skilled in the art will recognize certain variations, modifications, alterations, additions, and sub combinations thereof.

What is claimed is:

1. A magnon junction MJ comprising:
a first electrode layer formed by a non-magnetic conductive material;
a free magnetic layer arranged on the first electrode layer, and formed by a ferromagnetic conductive material;
an antiferromagnetic barrier layer arranged on the free magnetic layer, and formed by an antiferromagnetic insulator AFI material;
a reference magnetic layer arranged on the antiferromagnetic barrier layer, and formed by a ferromagnetic conductive material; and
a second electrode layer arranged on the reference magnetic layer, and formed by a non-magnetic conductive material,
wherein the reference magnetic layer has perpendicular magnetic anisotropy or a perpendicular magnetic moment component, a magnetic moment direction of which is fixed along a perpendicular direction,
wherein the free magnetic layer has perpendicular magnetic anisotropy or a perpendicular magnetic moment component, a magnetic moment direction of which is flippable along the perpendicular direction, and wherein there is an exchange coupling on an interface between the antiferromagnetic barrier layer and the ferromagnetic conductive material, and when a magnetic moment of the free magnetic layer is switched, a magnetic moment of the antiferromagnetic barrier layer is also switched, thereby reducing a current density required for switching the magnetic moment of the free magnetic layer.

2. The magnon junction of claim 1, wherein the first electrode layer and the second electrode layer are configured to apply a vertical switching current, and the vertical switching current is spin polarized when currenting through the reference magnetic layer; at an interface between the reference magnetic layer and the antiferromagnetic barrier layer, a part of the spin polarized current is converted into a magnon current and diffuses through the antiferromagnetic barrier layer to be injected into the free magnetic layer, and during the diffusion and injection, a magnon transfer torque MTT is generated, respectively; at the same time, another part of the spin polarized current tunnels into the free magnetic layer through the antiferromagnetic barrier layer, whereby under a combined action of the magnon transfer torque MTT generated by the magnon current and a spin transfer torque STT generated by the spin polarized current, a direction of the magnetic moment of the free magnetic layer is switched.

3. The magnon junction of claim 2, wherein the magnon current further generates a magnon transfer torque MTT when diffusing through the antiferromagnetic barrier layer, to cause directions of magnetic moments arranged on lattice points of the antiferromagnetic barrier layer in an antiparallel manner to be switched, thereby switching both a direction of a Néel vector of the antiferromagnetic barrier layer and the direction of the magnetic moment of the free magnetic layer.

4. The magnon junction of claim 1, wherein the first electrode layer is formed by a non-magnetic conductive heavy metallic material having a spin Hall effect.

5. The magnon junction of claim 4, wherein the first electrode layer is configured to apply a first in-plane switching current, which generates a spin polarized current diffusing to the free magnetic layer through the spin Hall effect and the spin polarized current generates a spin-orbit torque SOT for switching the magnetic moment of the free magnetic layer.

6. The magnon junction of claim 5, wherein the first electrode layer and the second electrode layer are further configured to apply a second vertical switching current, which is spin polarized when currenting through the reference magnetic layer; at an interface between the reference magnetic layer and the antiferromagnetic barrier layer, a part of the spin polarized current is converted into a magnon current, which diffuses through the antiferromagnetic barrier layer to be injected into the free magnetic layer and generates a magnon transfer torque MTT; at the same time, another part of the spin polarized current tunnels into the free magnetic layer through the antiferromagnetic barrier layer; the spin polarized current generates a spin transfer torque STT for switching a direction of the magnetic moment of the free magnetic layer, thereby switching the direction of the magnetic moment of the free magnetic layer under a combined action of the magnon transfer torque MTT and spin transfer torque STT generated by the second perpendicular switching current, as well as the spin-orbit torque SOT generated by the first in-plane switching current.

7. The magnon junction of claim 1, wherein the ferromagnetic conductive material for forming the reference magnetic layer and the free magnetic layer comprises one or more selected from a group consisting of the following materials: $NiCo_2O_4$, $Fe_3GeTe_2$, $VSe_2$, FePt, FePd, CoPt, CoPd, $[Fe/Pt]_N$, $[Co/Pt]_N$, $[Co/Pd]_N$, FeCr, CoCr, FeTb, CoTb, GdFeCo, TbFeCo, ultra-thin Co—Fe—B, and Co—Fe alloy thin films, where N is a positive integer equal to or greater than 1, wherein the antiferromagnetic insulator material for forming the antiferromagnetic barrier layer comprises one or more selected from a group consisting of the following materials: $Cr_2O_3$, CoO, NiO, FeO, MnO, $MnF_2$, MnS, $FeCl_2$, $GdFeO_3$, $NdFeO_3$, $SmFeO_3$, $BiCoO_3$, $BiNiO_3$, $LaFeO_3$, and wherein the antiferromagnetic configuration of the antiferromagnetic insulator material for forming the antiferromagnetic barrier layer is: A-type, wherein a direction of magnetic moment of one lattice point in an original cell is the same as those of two neighboring lattice points, but opposite to that of another neighboring lattice point; B-type, wherein a direction of magnetic moment of a lattice point in an original cell is the same as that of a neighboring lattice point, but opposite to those of another two neighboring lattice points; or C-type, wherein a direction of magnetic moment of one lattice point in an original cell is opposite to those of three neighboring lattice points, or the antiferromagnetic barrier layer has a helical magnetic configuration.

8. The magnon junction of claim 4, wherein the non-magnetic conductive heavy metallic material for forming the first electrode layer comprises one or more selected from a group consisting of the following materials: Pt, W, Ta, Pd, Ir, W, Bi, Mo, Pb, Hf, Ru, IrMn, PtMn, AuMn, $Bi_2Se_3$, $Bi_2Te_3$, and alloys or compounds of the elemental heavy metals mentioned above.

9. A method for operating a magnon junction, wherein the magnon junction comprises:

a first electrode layer formed by a non-magnetic conductive material;

a free magnetic layer arranged on the first electrode layer, and formed by a ferromagnetic conductive material;

an antiferromagnetic barrier layer arranged on the free magnetic layer, and formed by antiferromagnetic insulator material;

a reference magnetic layer arranged on the antiferromagnetic barrier layer, and formed by a ferromagnetic conductive material; and a second electrode layer arranged on the reference magnetic layer, and formed by non-magnetic conductive material, wherein the reference magnetic layer has perpendicular magnetic anisotropy or a perpendicular magnetic moment component, a magnetic moment direction of which is fixed in a perpendicular direction; the free magnetic layer has perpendicular magnetic anisotropy or a perpendicular magnetic moment component, a magnetic moment direction of which is flippable in the perpendicular direction; and the antiferromagnetic barrier layer has perpendicular magnetic anisotropy or a perpendicular magnetic moment component, and there is an exchange coupling at an interface between the antiferromagnetic barrier layer and the ferromagnetic conductive materials, and when a magnetic moment of the free magnetic layer is switched, a magnetic moment of the antiferromagnetic barrier layer is also switched, thereby reducing a current density required for switching the magnetic moment of the free magnetic layer, and wherein the method comprises:

applying a perpendicular switching current perpendicularly currenting through the magnon junction using the first electrode layer and the second electrode layer, wherein the perpendicular switching current is spin polarized when currenting through the reference magnetic layer;

at an interface between the reference magnetic layer and the antiferromagnetic barrier layer, converting a part of the spin polarized current into a magnon current, and diffusing the magnon current through the antiferromagnetic barrier layer to be injected into the free magnetic layer, wherein a magnon transfer torque MTT is generated respectively during diffusion and injection; at the same time, another part of the spin polarized current tunneling into the free magnetic layer through the antiferromagnetic barrier layer, whereby under a combined action of the magnon transfer torque MTT generated by the magnon current and a spin transfer torque STT generated by the spin polarized current, a direction of the magnetic moment of the free magnetic layer is switched.

10. The method of claim 9, wherein the first electrode layer is formed by a non-magnetic conductive heavy metallic material having a spin Hall effect, and the method further comprises:

applying an in-plane switching current currenting through the first electrode layer, wherein the in-plane switching current generates a spin polarized current that diffuses towards the free magnetic layer through the spin Hall effect, and the spin polarized current generates a spin-orbit torque SOT for switching the magnetic moment of the free magnetic layer, whereby under a combined action of the magnon transfer torque MTT and spin transfer torque STT generated by the perpendicular switching current, as well as the spin-orbit torque SOT generated by the in-plane switching current, the direction of the magnetic moment of the free magnetic layer is switched.

11. The method of claim 10, wherein the magnon current further generates a magnon transfer torque MTT to cause the magnetic moments on different lattice points of the antiferromagnetic barrier layer arranged in antiparallel directions to be switched, resulting in both a direction of a Néel vector of the antiferromagnetic barrier layer and the direction of the magnetic moment of the free magnetic layer being switched.

12. A magnon random access memory mRAM comprising an array of multiple magnon storage units, each of which comprises the magnon junction of claim 1.

13. A magnon microwave oscillator MMO comprising:
the magnon junction of claim 1; and
a current source for applying a current perpendicularly currenting through the magnon junction and generating microwave oscillation signals at both ends of the magnon junction,
wherein a magnitude of the current provided by the current source is adjustable to regulate the magnon transfer torque and spin transfer torque MTT+STT in the magnon junction, thereby regulating a frequency and amplitude of a magnetic moment precession in the free magnetic layer of the magnon junction, thereby controlling a frequency and amplitude of the microwave oscillation signal output at both ends of the magnon junction.

14. A magnon microwave detector MMD comprising:
the magnon junction of claim 1, wherein a magnetic moment of the magnon junction precesses with an alternating electromagnetic field generated by an external microwave signal;
a current source for applying a detection current vertically flowing through the magnon junction, to generate microwave oscillation signals at both ends of the magnon junction, wherein a frequency and amplitude of the microwave oscillation signal depend on a frequency and intensity of the external microwave signal, respectively; and
a signal analysis module for detecting the frequency and amplitude of the microwave oscillation signal, thereby determining the frequency and intensity of the external microwave signal.

15. A magnon random number generator MRNG comprising:
the magnon junction of claim 1; and
a current source for applying a consecutive current vertically flowing through the magnon junction, wherein the consecutive current has a predetermined current density to reduce a barrier height between parallel and antiparallel states of the magnon junction, to achieve random switching under thermal disturbance and then output random signals at both ends of the magnon junction.

16. A magnon p-bit random number generator MRNG comprising:
the magnon junction of claim 1; and
a current source for applying a consecutive current vertically flowing through the magnon junction, wherein the consecutive current has a predetermined current density to reduce a barrier height between parallel and antiparallel states of the magnon junction and to achieve random switching under thermal disturbance, thereby outputting random signals at both ends of the magnon junction; and a magnitude of a magnon transfer torque or spin transfer torque is adjusted by adjusting a magnitude of the consecutive current, to change a probability of generating parallel and antiparallel states and to achieve a probability adjustable random number generator.

17. An electronic device comprising at least one of the following devices:
the magnon random access memory of claim 12;
the magnon microwave oscillator of claim 13;
the magnon microwave detector of claim 14;
the magnon random number generator of claim 15; and
the magnon p-bit random number generator of claim 16.

* * * * *